July 14, 1925.
J. M. KING
CAR HEATING SYSTEM
Filed Feb. 5, 1925
1,546,083
2 Sheets-Sheet 1
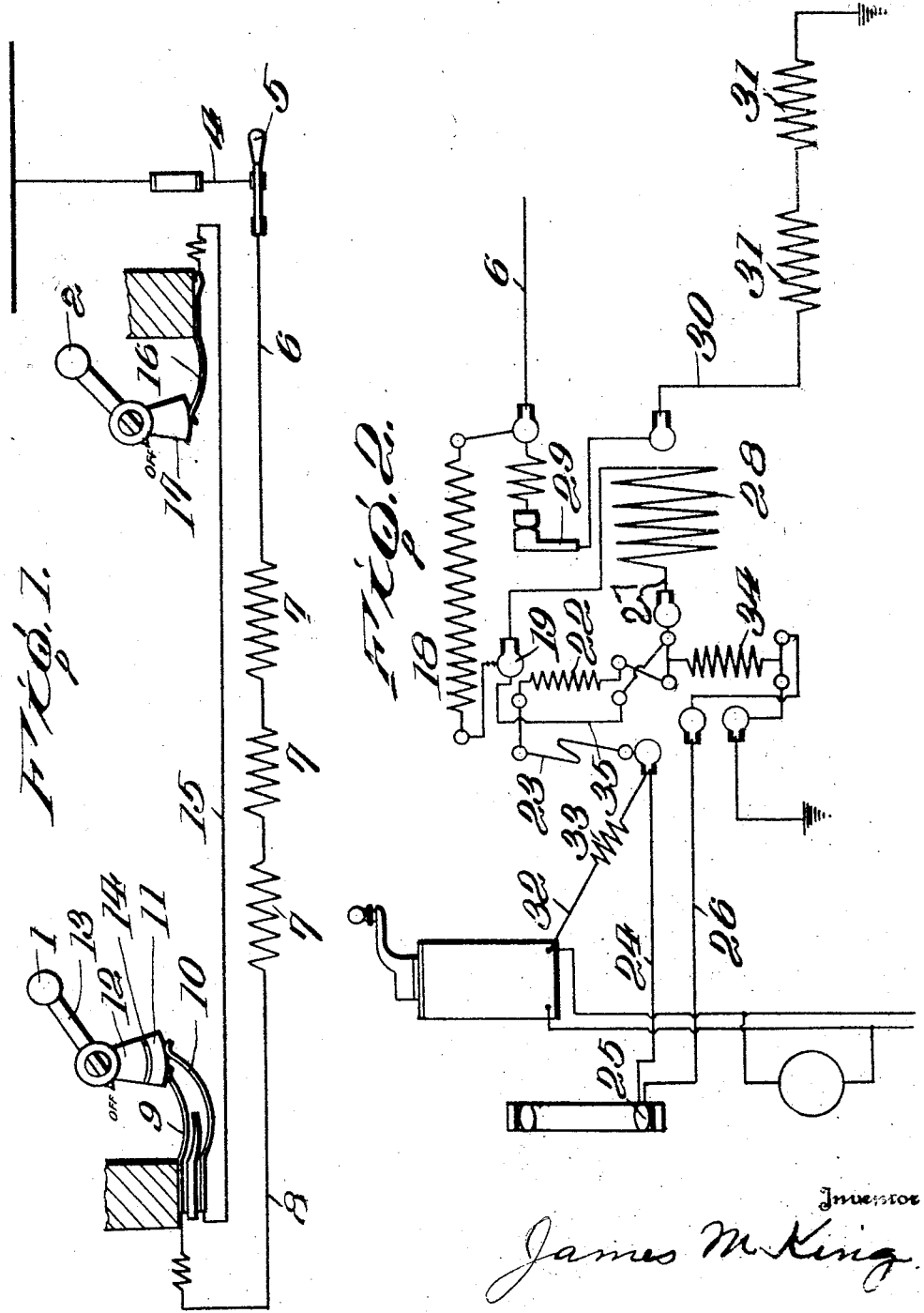
Inventor
James M. King
By S. H. Evans
Attorney

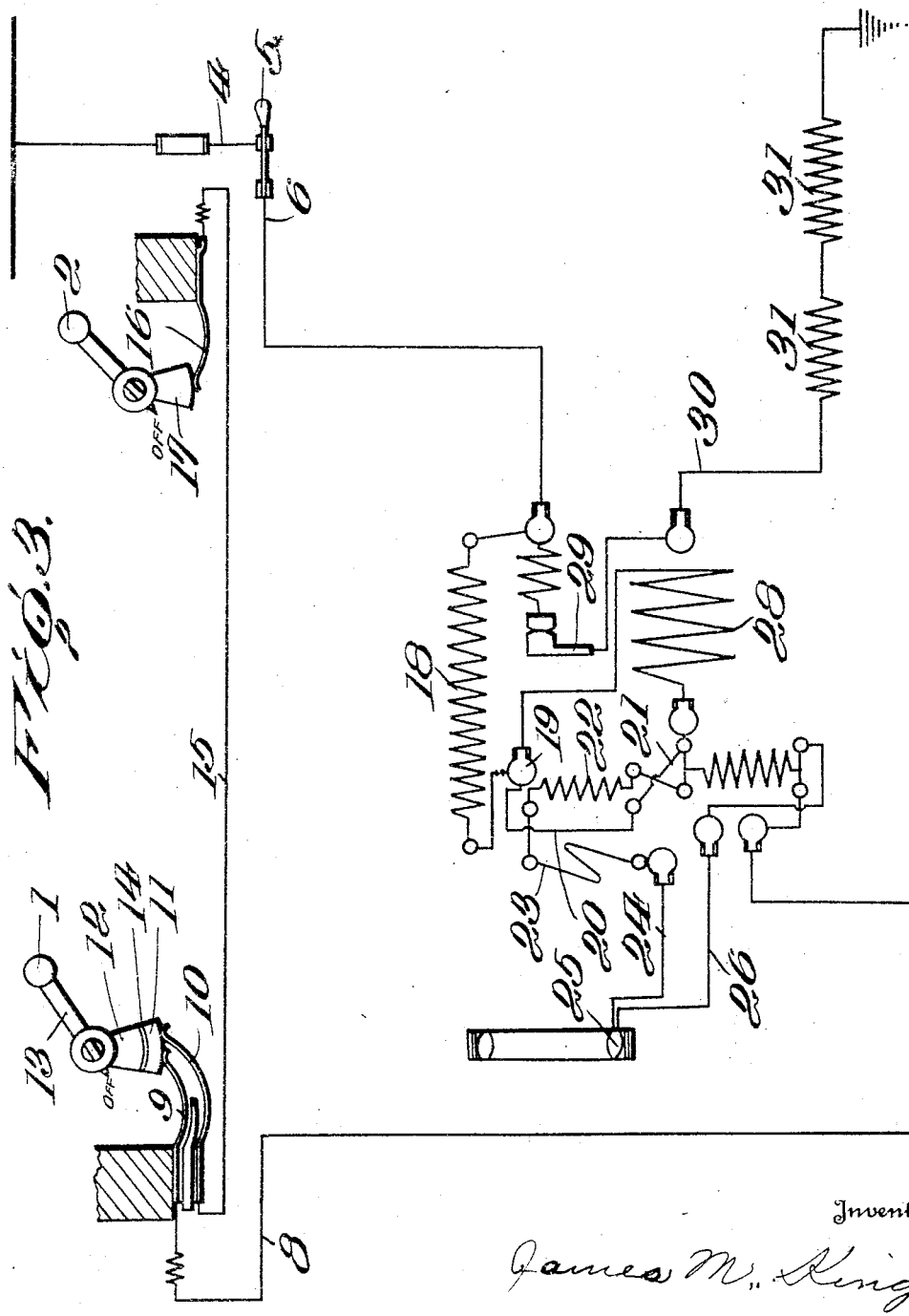

Patented July 14, 1925.

1,546,083

UNITED STATES PATENT OFFICE.

JAMES M. KING, OF DANVILLE, VIRGINIA.

CAR-HEATING SYSTEM.

Application filed February 5, 1925. Serial No. 7,335.

*To all whom it may concern:*

Be it known that I, JAMES M. KING, citizen of the United States, residing at Danville, in the county of Pittsylvania and State of Virginia, have invented certain new and useful Improvements in Car-Heating Systems, of which the following is a specification.

My invention relates to improvements in car heating systems.

The object of my invention is to provide a car heating system adapted to be in circuit with the motor controller, whereby the current to the heater is cut off when the controller is on, and supply current to the motor, and the current turned on to the heater when the controller is off, and the car is coasting or standing still, and whereby the drain on the current is greatly reduced as both the heaters and the motor are not drawing current from the supply at the same time. This is particularly adapted for use where the supply of current is limited and when the traffic is heavy, and the peak is reached, it will be found that a great number of cars can be operated under full power, than when the cars are drawing the current for both heat and power, at the same time.

Another object of my invention is to provide means adapted to be readily connected up with any of the well known automatically controlled car heating systems, automatically controlled by a thermometer or thermostat so that the current is automatically turned on to the heaters when the car reaches the minimum low temperature and automatically turned off when the car reaches the maximum temperature set by the thermometer or thermostat, whereby heaters cannot be drawing on the current when the controller is moved to supply the motor with current.

A further object of my invention is to provide a simple, cheap and effective heating system having the general arrangement and combination of parts which can be attached to any heating system at a very low cost.

In the accompanying drawings:—

Figure 1 is a diagrammatical view of my invention applied to the ordinary heating coil of a car heater.

Figure 2 is a diagrammatical view of the invention as applied to an automatically controlled car heating system now in use on electric cars.

Figure 3 is a diagrammatical view of the automatically controlled car heating system shown in Figure 2, showing a modified form of automatically cutting off the heaters when the controller is turned to supply current to the motors.

Referring now to the drawings, 1 and 2 represents the controllers carried by the ends of the car and can be of any well known forms which control the current from the trolley cars to the motors. The trolley wire is represented by 3, and the heating circuit 4 takes the current therefrom, and said current is cut off or on by a switch 5 which as shown is of the ordinary knife type. The current leads from this switch through the wire 6 to the heating coils or rheostats 7 which are arranged in any desirable place on the car. The current leads from the rheostats through the wire 8 to brush contact plate 9 which is insulated from the car and adjacent contact plate 9, and insulated therefrom and from the car is a brush contact 10 which extends outwardly and has its outer end in the same plane as the contact 9, and both of which are adapted to engage the metal plate 11 which is carried by the arm 12, of the controller 13, and insulated therefrom by the insulation 14 and whereby the metal plate 11 closes the circuit between the two brush contacts 9 and 10 when the controller is in the off position as shown, and the current cut off from the motors. When the arm 12 is moved away from the contacts 9 and 10, when the controller is moved to the on position the circuit between the contacts is broken. A wire 15 leads from the contact 10 to the brush contact 16, at the opposite end of the car adjacent the controller 2, and engages a contact plate 17 carried by the controller and said controller being grounded the circuit is completed through the heaters when both of the controllers are in the position shown in Figure 1 of the drawings.

By this structure it will be seen that the heaters or rheostats are controlled by the controllers at each end of the car, and the controller at the rear end of the car is always in an off position so that the device is sure to operate when the controller at the front of the car is being operated by the motorman, to cut off the current to the heaters when the controller is moved to the on position supplying the current to the motor, and turn on the current to the heaters when the controller is moved to the off position.

In the form shown in Figure 2 of the drawings like reference numerals indicate like parts so far as the controllers and contacts are concerned, and the operation thereof is the same and therefore another description of these parts and operation is not necessary. In this form the wire 6 leads from the switch 5, to the heating system shown through the resistance 18 through the relay switch 19, and through the wire 20, through the wires 21 and relay 22, and through the fuse 23, out through the wire 24 to the thermometer 25, and returning therefrom through the wire 26 and out to the wire 8 and is grounded, through the controllers the same as described in respect to Figure 1. This takes place when the temperature is at or above the desired point. When the temperature falls below this predetermined point and the controller is turned off and the circuit is broken through the thermometer the current is shunted from the relay through the wire 27, to the magnetic coil 28, operating the snap switch 29, and the current passes directly from the wire 6 through the switch 29, and wire 30, to the heating coils 31 and is grounded. When controller is on the on position the circuit is broken and the snap switch under the tension of a spring returns to its normal open position and the heaters are not in operation.

In the form shown in Figure 3 of the drawings, I run a wire 32 from one of the motor leads in the controller box through a resistance coil 33 to the thermometer lead 24. When the controller is on a small current will flow from the motor lead up through the fuse 23 into the relay 22, and through the resistance 34 to the ground thereby closing the relay switch 19 and allowing the trolley current from the resistance 18 to flow through the relay switch and wire 35 and resistance 34 to ground. This shuts the current from the magnetic coil 28 causing the switch to open so no current flows through the wire 30 to the heaters 31.

When the controller is on the off position no current flows through wire 32 and relay switch 19 is open so current from trolley flows through resistance 18, and magnetic coil 28, through resistance 34 to ground energizing coil 28, and closing switch 29 allowing current to pass from the trolley through wires 26 and 30 to the heater 31 and ground.

Having thus fully described my invention what I claim is:—

1. A car heating system comprising a heating coil, and means controlled by the motor controller for cutting off the current from the heating coil when the current is passing to the motor.

2. A car heating system comprising a heating coil, and means operated by the motor controller for cutting off the current from the heating coil when the current is passing to the motor, and turning on to the heating coil when it is cut off from the motor.

3. A car heating system comprising a heating coil, and means carried by the motor controller for engaging the terminals of an electric heating system for closing the circuit when the controller is in a position with the current cut off from the motor and breaking the circuit when the controller is moved to pass the current to the motor.

4. A car heating system comprising a heating coil, and means operated by the motor controller for cutting off the current from the heating coil when the current is passing to the motor, and turning it on to the heating coil when the current is cut off from the motor and a hand switch permanently cutting in and off the current to the heating coil.

5. The combination with an automatically controlled car heating system, of means operated by the controller for cutting off the current from the heating coils when the controller is supplying current to the motor and turning it on to the heating coil when the current is cut off from the motor.

6. The combination with an automatically controlled car heating system, of a circuit opened and closed by the controller for cutting the current from the heating coils when the controller is supplying current to the motor, and closing the circuit and completing the second circuit for supplying the heater with current when the controller is in an off position.

7. The combination with a car heating system, of means controlled by the controller for cutting out the heating system when the controller is in an off position.

8. The combination with an automatically controlled car heating system, of means operated by the controller when on, for allowing a small current to pass from the motor leads shunting the current from the magnetic coil and opening the switch, and breaking the current to the heaters.

9. The combination with an automatically controlled car heating system, of means operated by the controller when on, for allowing a light current to pass from the motor leads shunting the circuit of the heating system and breaking the circuit to the heaters.

10. The combination with a thermostatic control car heating system, of means operated by the controller when on, for allowing a light current to pass from the motor leads, shunting the circuits of the heating system, and breaking the circuit to the heater, and when the controller is off restoring the circuit to the heater.

11. A car heating system comprising a heating coil, and means controlled by the motor controller for cutting off the current from the heating coil when the current is passing to the motor, and restoring the current to the heating coil when the controller is cut off.

12. The combination with a thermostatic control car heating system, means operated by the controller for cutting off the current from the heating coil when the controller is supplying current to the motor, and turning it on to the heating coil when the current is cut off from the motor.

13. The combination with a thermostatic control car heating system, of a circuit opened and closed by the controller for cutting off the current from the heating coil when the controller is supplying current to the motor and closing the circuit and completing a second circuit for supplying the heater with current when the controller is in an off position.

In testimony whereof I affix my signature.

JAMES M. KING.